United States Patent [19]

Morita

[11] Patent Number: 5,135,110
[45] Date of Patent: Aug. 4, 1992

[54] MAGNETIC TAPE CASSETTE CASE AND INDEX CARD THEREFOR

[75] Inventor: Kiyoo Morita, Kanagawa, Japan

[73] Assignee: Fuji Photo Film Co., Ltd., Kanagawa, Japan

[21] Appl. No.: 774,889

[22] Filed: Oct. 11, 1991

[30] Foreign Application Priority Data

Oct. 12, 1990 [JP] Japan .............................. 2-107387[U]
Jan. 11, 1991 [JP] Japan ................................ 3-3375[U]

[51] Int. Cl.⁵ .................... B65D 85/672; B65D 75/54; B65B 3/04
[52] U.S. Cl. .................... 206/387; 206/459; 53/474; 53/415
[58] Field of Search .................. 206/387, 459; 53/474, 53/415

[56] References Cited

U.S. PATENT DOCUMENTS

| | | | |
|---|---|---|---|
| 4,297,826 | 11/1981 | Woertche | 53/284.5 X |
| 4,520,927 | 6/1985 | Sato | 206/387 |
| 4,987,999 | 1/1991 | Hehn | 206/387 |

*Primary Examiner*—William I. Price
*Attorney, Agent, or Firm*—Sughrue, Mion, Zinn, Macpeak & Seas

[57] ABSTRACT

Magnetic tape cassettes are typically stored in a case which includes a cover having a pocket, and a casing portion. To identify the contents recorded on the magnetic tape, an index card is disposed between the magnetic tape cassette and case. When the index card is inserted into the case at high speeds during manufacturing thereof, air is trapped between the case and the index card causing inefficient production and damage, such as bending, to the index card. To remove air, air passage holes are provided within a side wall of the pocket of the case or within the bent portion of the index card.

8 Claims, 5 Drawing Sheets

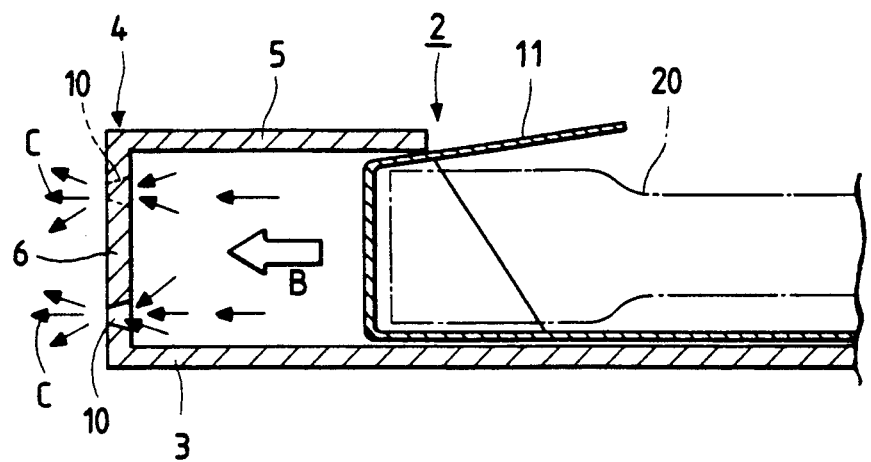
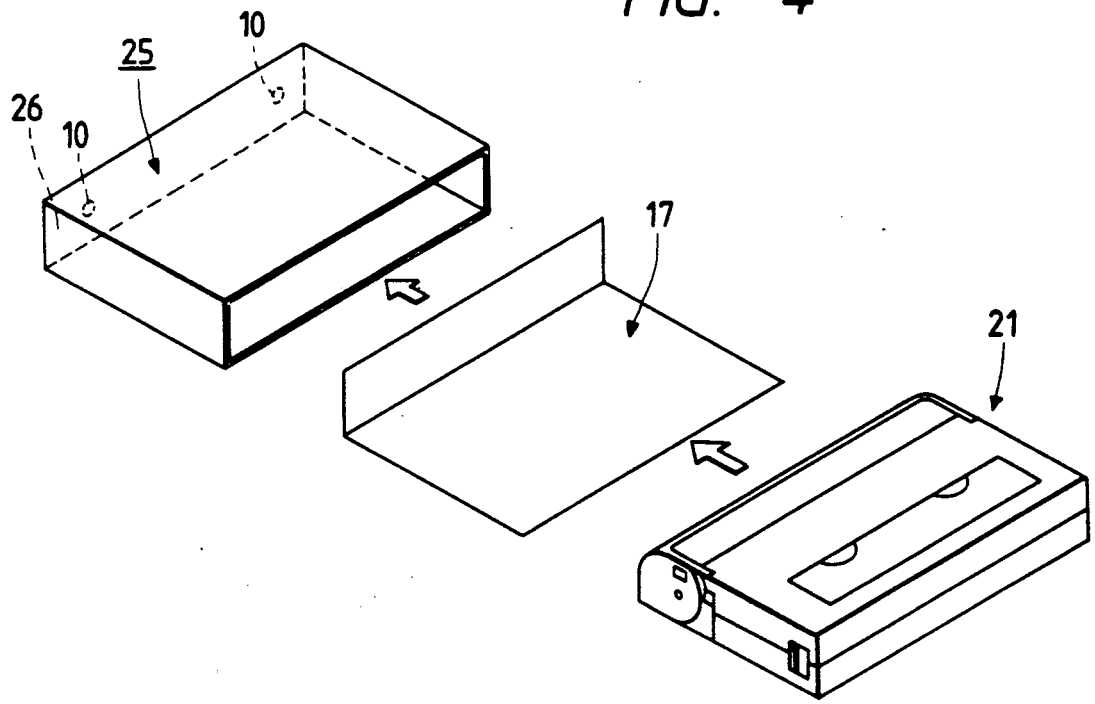

MAGNETIC TAPE CASSETTE CASE AND INDEX CARD THEREFOR

BACKGROUND OF THE INVENTION

The present invention relates generally to a magnetic tape cassette case, and more particularly to a case for receiving a magnetic tape cassette with an index card disposed therebetween, wherein the case or index card where air entrapped in the pocket-shaped portion of the case is vented when the cassette and index card are inserted therein.

An audio or video magnetic tape cassette (hereinafter referred to simply as a cassette) when in an inoperative state is typically stored in a magnetic tape cassette case (hereinafter referred to simply as a case). The case is used primarily for protecting the cassette from damage due to external forces and for preventing dust from entering the interior of the cassette. In recent years, the performance of magnetic tape cassettes and recording-/reproducing apparatus have improved such that even a minute amount of dust clinging to a magnetic tape is likely to cause problems such as signal dropout. Therefore, it is very important to prevent dust from entering the cassette.

Magnetic tape cassette cases, most of which are made of plastic, include an inner housing portion having a pocket into which the cassette is inserted, and an outer housing portion pivotally coupled to the inner housing portion so that they can be closed and opened to and from each other. Other cases are made of a resin sheet punched out to a prescribed form, bent, and conjoined to itself with an adhesive so as to be shaped like a book container.

To visually indicate or identify items recorded on a magnetic tape, the conventional case described above is provided with an index sheet 11 which allows such items to be written thereon, as shown in FIG. 1. In FIG. 1, a conventional case is known and will now be described in more detail.

The case 30 includes a cover 2 having a pocket 4, and a casing portion 8 represented by phantom lines pivotally coupled to the cover 2. The casing portion 8 rotates about a support shaft (not shown), which is pivotally fitted into shaft holes 7a, to open and close the case. The index sheet 11, which fits into the pocket 4 of the cover 2, is formed by folding it along folding lines 12 and 13 at the right-hand end part thereof, forming a U-shaped sectional contour. The folded part 15 of the index sheet 11 is inserted into the pocket 4 of the cover 2, and then desired identification marks such as the title of the recorded contents can be written onto the surface of an upright wall 13a at the folded part 15 of the index sheet 11. The written marks can visually be read through a transparent rear surface wall 6 of the case 30.

Since the open front part of the magnetic tape cassette is covered with the bent portion of the index sheet, the cassette is better protected from damage due to external forces.

The index sheet 11, which is folded along the folding lines 12 and 13 in the U-shaped configuration, is dimensioned such that a height $l_2$ of the upright wall 13a as measured in the direction of a thickness of the cassette is substantially equal to the height $L_2$ of the pocket 4 as measured in the direction of a thickness of the pocket 4. The height $l_1$ of the folded part 15 of the index sheet 11 at the forwardmost end of the same is larger than the height $L_2$ of the pocket 4. With such construction, when the index sheet 1 is inserted into the pocket 4, it is firmly held in the pocket 4 with the aid of the elastic force of the folded part 15 of the index sheet 11, which expands outwardly. Thus, the index sheet 11 will not fall out of the pocket 4, even if no cassette is in the case 30. In addition, since the folded part 15 of the index sheet 11 elastically contacts a small wall surface 5 of the pocket 4, a cassette will not collide with the folded part 15 of the index sheet 11 when it is inserted into the pocket 4 of the case 30.

However, the conventional case constructed in the above-described manner, has the following disadvantages. That is, the index sheet 11 receives a large resistance when it is inserted into the pocket 4 on a mass production line, resulting in an inefficient insertion operation. Particularly, when the index sheet 11 is inserted into the pocket 4 at high speed with automatic equipment, it receives a larger resistance due to the compression of air than from a frictional resistance because air is entrapped in the space between the pocket 4 and upright wall 13a of the index sheet 11 and cannot be vented to the outside. This further causes the index sheet 11 to be bent as it is inserted in the pocket 4. Thus, there arises another problem associated with the conventional case on a mass production line, namely, the inserting operation can bend the index sheet.

SUMMARY OF THE INVENTION

Accordingly, it is a general object of the present invention to provide a magnetic tape cassette case wherein an index sheet can correctly and efficiently be inserted into a pocket at a high speed without damaging the index sheet and which is free of the above-mentioned problems and disadvantages.

It is a more specific object of the present invention to provide a magnetic tape cassette case wherein an index sheet can correctly and efficiently be inserted into a pocket at a high speed without damaging the index sheet by eliminating any air trapped in the space in front of the inserted index sheet.

In accordance with the above and other objects, the present invention provides a case for receiving a magnetic tape cassette including a pocket into which the magnetic tape cassette and an index sheet are inserted together in a predetermined direction, wherein a plurality of air holes are formed on a rear wall of the pocket.

Further in accordance with the above objects, each of the air holes has a tapered sectional contour having an aperture diameter which gradually decreases toward the outer surface side of the case.

Further in accordance with the above objects, the present invention also provides a second embodiment of a case for receiving a magnetic tape cassette including a pocket into which the magnetic tape cassette and an index sheet are inserted together in a predetermined direction, wherein a plurality of air holes are formed on a bent portion of the index card that is parallel with a rear surface of the pocket thereby reducing the pressure of air in the pocket, at the time of inserting the magnetic tape cassette and the index card.

Still further, the invention provides a case for receiving a magnetic tape cassette including a pocket into which the magnetic tape cassette and an index sheet are inserted together, and means for venting air trapped between the pocket and the magnetic tape cassette and the index sheet when the magnetic tape cassette and the index sheet are inserted into the pocket.

BRIEF DESCRIPTION OF THE DRAWINGS

FIG. 3 is a fragmentary sectional view of the case shown in FIG. 2.

FIG. 4 is a perspective view of a case for receiving a magnetic tape cassette in accordance with another embodiment of the present invention, illustrating the case in a disassembled state.

DESCRIPTION OF THE PREFERRED EMBODIMENTS

The present invention will now be described in detail with reference to the accompanying drawings, which illustrate preferred embodiments of the present invention.

Figure 1:
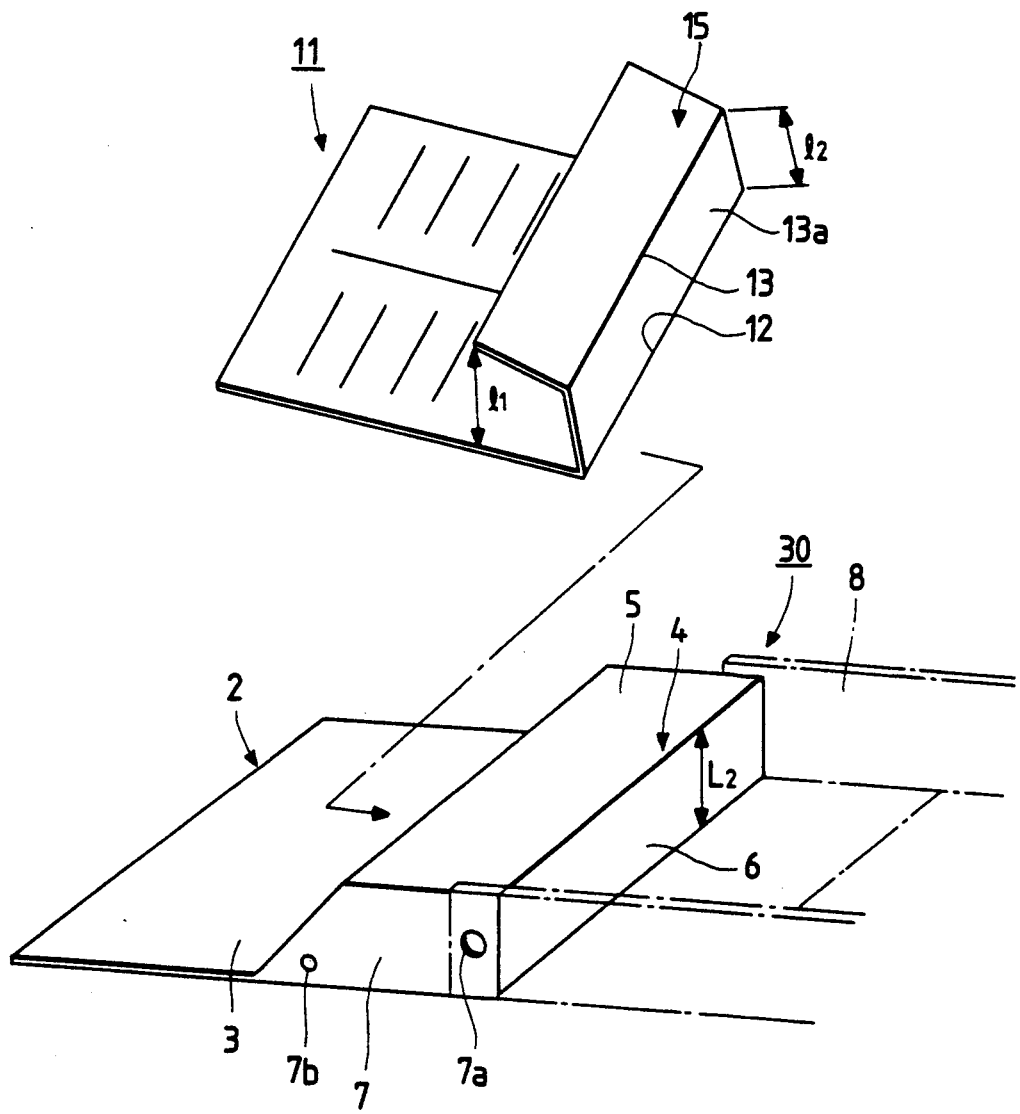
FIG. 1 is a perspective view of a conventional magnetic tape cassette case and a conventional index card.
Figure 2:
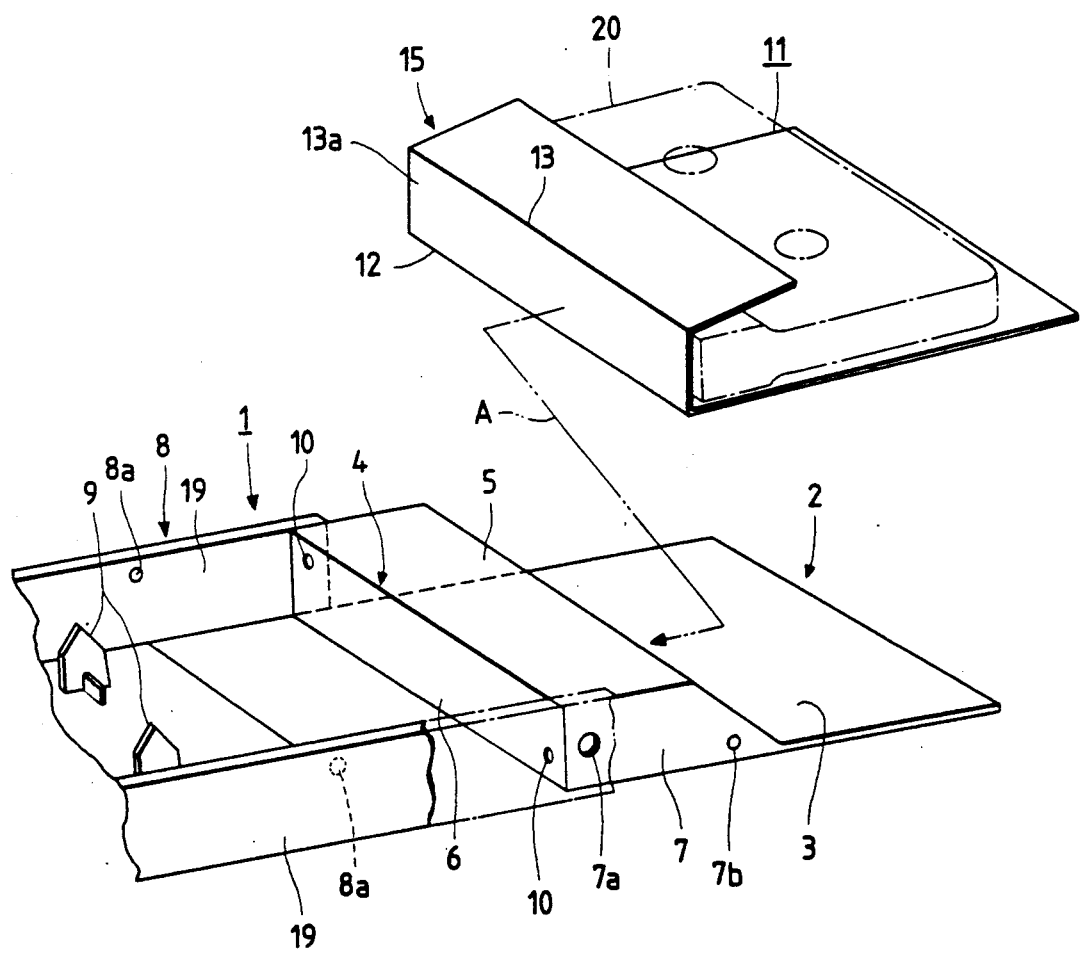
FIG. 2 is a perspective view of a case for receiving a magnetic tape cassette in accordance with an embodiment of the present invention.
Figure 5:
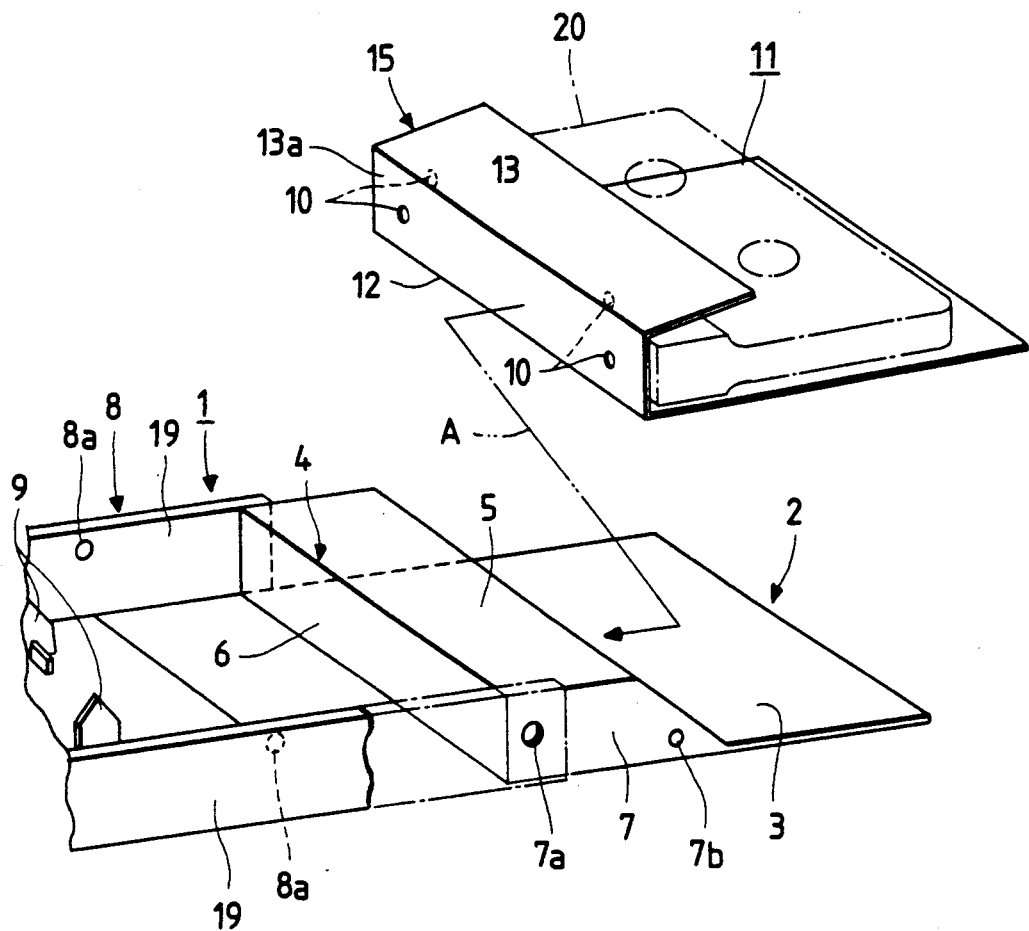
FIG. 5 is a perspective view of an index card according to another embodiment of the present invention.

FIGS. 2 and 3 show a magnetic tape cassette case 1 which is essentially composed of a cover 2 including a pocket 4 in which the fore thickness increased portion of a cassette 20 is received, and a casing portion 8 including a pair of rotation-preventing projections 9 adapted to be inserted into the corresponding shaft insert holes of the cassette 20. The case 1 is constructed such that the casing portion 8 and the cover 2 can turnably be opened or closed by turning about a pivotal portion, which includes an opposing pair of support shafts extending inward of the casing portion 8 and shaft holes 7a formed through an opposing pair of side walls 7 of the pocket 4 so as to allow the support shafts to be fitted into the shaft holes 7a.

The pocket 4 is arranged on the pivotal portion side of the cover 2 and has a large wall surface 3, an opposing pair of side walls 7 located on the left and right sides of the large wall surface 3, a small wall surface 5 located opposite to the large wall surface 3, and a rear or bottom surface wall 6. A plurality of air holes 10 are formed through the rear surface wall 6 at positions in the vicinity of the opposite ends as seen in the longitudinal direction of the rear surface wall 6. As best illustrated in FIG. 3, each of the air holes 10 is tapered such that each aperture diameter gradually decreases toward the outside surface side of the case 1.

When the case 1 is closed, the small surface wall 5 of the pocket 4 positionally coincides with the bottom wall of the casing portion 8, thereby forming a common wall. In addition, when the case 1 is closed, engagement projections 7b on the side walls 7 of the pocket 4 are brought into engagement with recesses 8a on side walls 19 of the casing portion 8 to prevent the case 1 from unexpectingly opening.

The index sheet 11, which is fitted into the pocket 4 of the cover, is folded along folding lines 12 and 13 in a U-shaped sectional contour. The folded part 15 of the index sheet 11 is inserted into the pocket 4 of the cover 2 so that a description, such as the title of the contents recorded on the magnetic tape cassette 20, written on the surface of an upright wall 13a of the folded part 15 can be read through the transparent rear surface wall 6 of the case 1.

Since the index sheet 11 is folded in the U-shaped sectional contour, the opening portion of the magnetic tape cassette 20 is enclosed by the folded part 15 of the index sheet 11 when the two are inserted in the case 1 to further function to protect the magnetic tape cassette 20 from damage caused by external forces.

Next, a method of fitting the index sheet 11 into the case 1 constructed in the aforementioned manner will be described.

As the magnetic tape cassette 20 is squeezed into the case 1 while the index sheet 11 is interposed between the case 1 and the magnetic tape cassette 20, the folded part 15 of the index sheet 11 is flexibly introduced into the interior of the pocket 4, as shown in FIG. 3.

The air trapped in front of the upright wall 13a of the index sheet 11 is compressed by the upright wall 13a, but since air holes 10 are formed through the rear surface wall 6, the air is vented to the outside through the air holes 10. Thus, no air is trapped in the space in front of the upright wall 13a, and, moreover, the air compressing phenomenon is eliminated regardless of how the index sheet 11 is inserted. As a result, the index sheet 11 can smoothly and efficiently be fitted into the pocket 4 of the cover 2.

Since each air hole 10 is designed to have a tapered sectional shape such that it has a larger diameter on the pocket inner side than on the case outer side, dust is prevented from entering the interior of the pocket 4. Moreover, air is easily discharged from the interior of the pocket 4 to the outside.

In addition, since all of the air holes 10 are closed with the upright wall 13a of the index sheet 11 while the index sheet 11 is fitted into the pocket 4, the dust proofing function of the case 1 is not degraded.

Additionally, since the folded part 15 of the index sheet 11 has a height substantially equal to the inner height of the pocket 4, and because it is elastically received in the pocket 4 in such a manner as to expand by its own elastic force, the index sheet 11 will not fall out of the case 11.

It should of course be understood that the present invention should not be limited only to the aforementioned embodiment wherein the index sheet 11 is designed to have a U-shaped sectional contour. Alternatively, the present invention may equally be applied to a case where the folded part 15 of the index sheet 11 is designed to have an L-shaped sectional contour.

For example, as shown in FIG. 4, a book-type case 25, which is typically used for receiving 8 mm video magnetic tape cassettes, is designed such that an index sheet 17 and a magnetic tape cassette 21 are received therein. Here, the whole case 25 can be considered similar to the pocket in the preceding embodiment of the present invention. The folded part of the index sheet 17 is not designed in a U-shaped sectional contour but in a L-shaped sectional contour. In addition, air holes 10 are formed through a rear surface wall 26 of the case 25.

According to the embodiment described above, a plurality of air holes are formed at the deepest positions of the pocket. However, the present invention should not be limited only to these positions. Air holes may be formed at any positions where air can effectively be vented to the outside. For example, air holes may be formed at other positions within the vicinity of the rear surface wall 6 or 26. Additionally, the number of air holes can be determined arbitrarily. The contour of each air hole should not be limited only to a circle, and each air hole may be designed to have a slit-shaped contour or the like.

As described above, according to the present invention, since a case for receiving a magnetic tape cassette is constructed such that a plurality of air holes are formed on a side wall at the deepest positions of a pocket or in the vicinity thereof, air can reliably be vented to the outside through the air holes when an index sheet is inserted into the pocket, even when the index sheet is constructed in such a manner as would otherwise entrap air in the pocket. Thus, there does not arise the problem of air being entrapped in the space in front of the index sheet in the pocket, resulting in the index sheet not properly fitting into the pocket.

Further, according to the present invention, since each case can be shipped after a cassette is received in the case together with an index sheet on an automatic mass production line in a factory, the operational efficiency for producing such cases is substantially improved.

FIGS. 5-8 show an index card 11 in accordance with another embodiment of the present invention.

As described in reference to the preceding embodiment, the index card 11 is bent on bending lines 12 and 13 near one end of the card so that the card is shaped as a J. However, this embodiment provides two air passage holes 10 at desired intervals in the front part 13a of the bent portion 15.

A method of inserting the index card 11 into the case 1 and the operation of the air holes 10 are now described.

Figure 6:
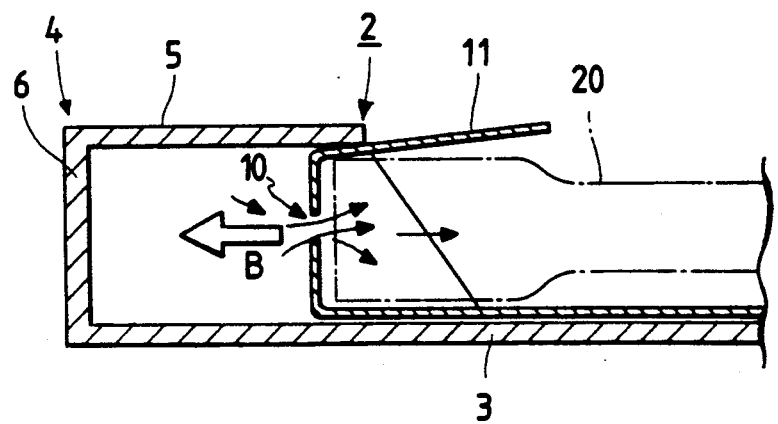
FIG. 6 is a partial sectional view of the index card of FIG. 5.

The magnetic tape cassette 20 is pinched within the index card 11, and then pushed into the case 1 so that the bent portion 15 of the card is inserted into the pocket 4 of the inner housing portion 2 of the case while being flexed by the front portion of the cassette and the inner housing portion, as shown in FIG. 6. Any air in the pocket 4 is pushed toward the front part 13a of the bent portion 15 of the card 11 and vented through the air passage holes 10 of the front part. In other words, the air is not confined to the pocket 4, and hence is not compressed, even if the cassette 20 and the card 11 are rapidly pushed into the case 1. For this reason, the card 11 can be rapidly and efficiently inserted into the pocket 4. When the card 11 is completely received in the case 1, the air passage holes 10 of the card are closed by the front part 6 of inner housing portion 2 of the case 1. Since the width of the bent portion 15 of the card 11 is nearly equal to the depth of the pocket 4, and the bent portion has an elastic self-spreading force in the pocket, the card is unlikely to drop out of the pocket.

Figure 7:
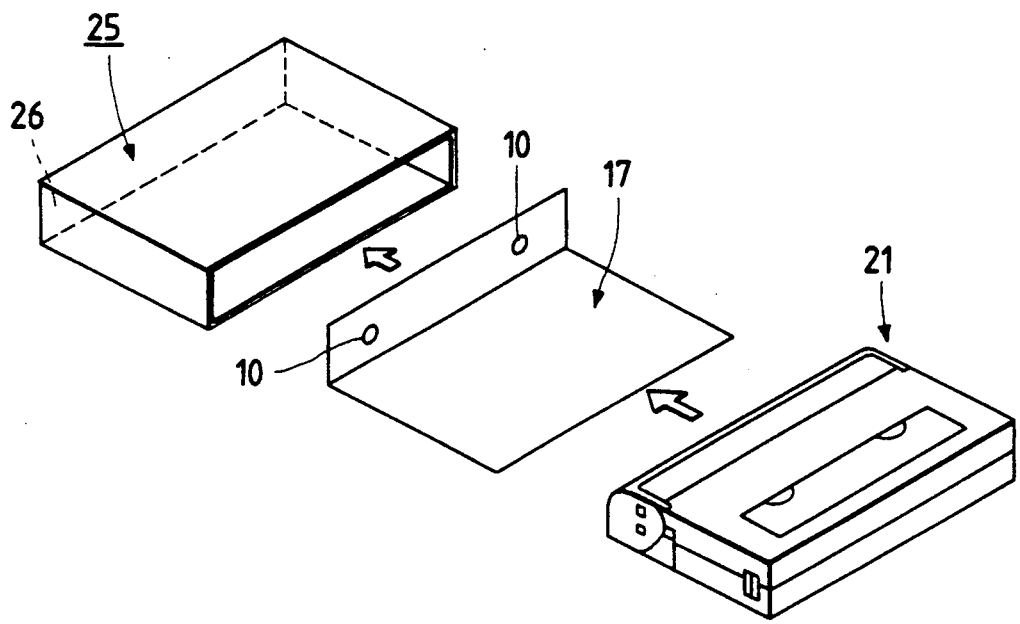
FIG. 7 is a perspective view of an index card according to another embodiment of the present invention.

The index card 11 may also be shaped as a different form such as an L, as shown in FIG. 7, which illustrates another embodiment of the invention. The L-shaped index card is for a magnetic tape cassette 21, such as an 8 mm video magnetic tape, which is housed in a case 25 shaped as a book container to constitute a pocket as a whole. The index card 17 is bent as an L in which the front part of the card 17 has air passage holes 10.

Figure 8:
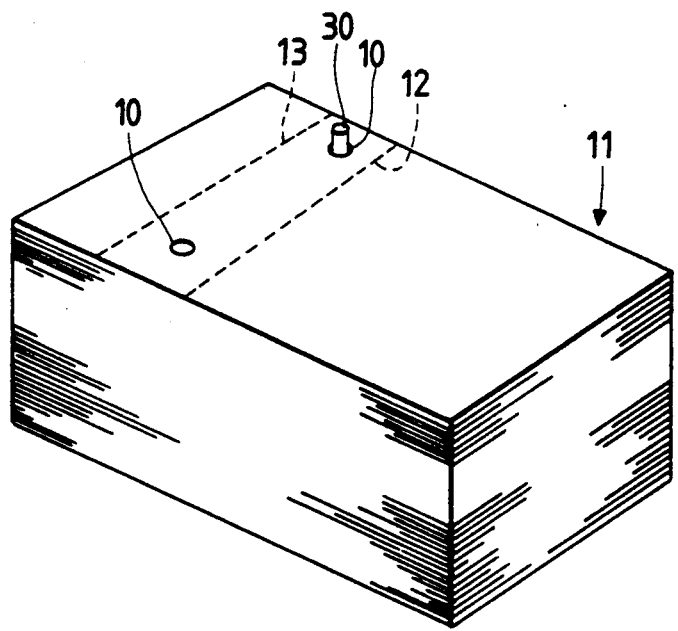
FIG. 8 is a perspective view of the index cards shown in FIG. 5, in the state that the cards are not bent but piled together.

The index cards 11 and 17 have not only the above-mentioned advantage, but also the further advantage for manufacturing in which the index cards are automatically inserted into the case. For automatic insertion, the index cards need to be prepared in a "trued-up" state on a manufacturing machine. Since the index cards have the air passage holes 10, a guide member 30 can be inserted into the holes, as shown in FIG. 8, to position the cards so that the reloading, orientation, etc. of the index cards can be easily performed.

Although the air passage holes 10 are provided in the front part of each of the index cards 11 and 17, the present invention is not limited thereto, and the holes may be provided elsewhere so long as the air in the pocket of the case is effectively discharged or vented from the pocket at the time of inserting the card in the case. For example, the holes 10 may be provided on the bending lines 13 as shown by dotted lines in FIG. 5, or provided on the other bending line 12. Since the air having gone out of the pocket 4 through the holes 10 provided on the bending line is effectively discharged through between the index card 11 and the cassette 20, the air is unlikely to enter the open front part of the cassette. Each of the holes 10 may be shaped not only as a circle but also as other various forms such as a slender oblong.

Since the bent portion of an index card provided in accordance with the present device has air passage holes which are located at the innermost part of a pocket into which the card is inserted, air in the pocket goes out of it through the holes at the time of the insertion although the air is pushed in the pocket. For this reason, the air is prevented from being confined in the pocket at the time of the insertion. The fitting property of the card is thus enhanced. Besides, the air passage holes can be used to position the index cards in a stacked position. For this reason, the handling property of the cards is enhanced. Because of these advantages, the card and a magnetic tape cassette can be smoothly and efficiently inserted into a case through automatic operation before shipment.

Finally, the present invention should not be limited only to the aforementioned embodiment, and may be applied to a case for receiving a VHS-system video magnetic tape cassette or a $\beta$-system video magnetic tape cassette.

There has thus been shown and described a novel apparatus for a magnetic tape cassette case and index card which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A case for receiving a magnetic tape cassette comprising a casing portion; and a cover comprising a pocket into which said magnetic tape cassette and an index sheet are inserted together in a predetermined direction, wherein a plurality of air holes are formed on a rear wall of said pocket.

2. A case for receiving a magnetic tape cassette as recited in claim 1, wherein each of said air holes has a tapered sectional contour with an aperture diameter that gradually decreases toward the outer surface side of said case.

3. A case for receiving a magnetic tape cassette as recited in claim 1, wherein said plurality of air holes are located at opposite ends of said rear surface wall.

4. A case for receiving a magnetic tape cassette as recited in claim 1, wherein said index sheet has one of a J-shaped or L-shaped sectional contour.

5. A case for receiving a magnetic tape cassette comprising a casing portion; and a cover comprising a pocket into which said magnetic tape cassette and an index sheet are inserted together in a predetermined direction, wherein a plurality of air holes are formed on a bent portion of said index card that is parallel with a rear surface of said pocket thereby reducing the pressure of air in said pocket at the time of inserting said magnetic tape cassette and said index card.

6. A case for receiving a magnetic tape cassette as recited in claim 5, wherein said index card has one of a J-shaped or L-shaped sectional contour.

7. A method of automatically inserting a magnetic tape cassette and index sheet into a case, comprising the steps of:
 a) bending said index sheet into a predetermined form;
 b) forming a plurality of air holes into a bent portion of said index sheet;
 c) covering an open portion of said magnetic tape cassette with said bent portion of said index sheet; and
 d) inserting said magnetic tape cassette and said index sheet into a pocket portion of said case such that air entrapped between said pocket portion and said magnetic tape cassette and index sheet is vented through said plurality of holes formed in said bent portion of said index sheet.

8. A method of automatically inserting a magnetic tape cassette and index sheet into a pocket portion of a magnetic tape cassette case, comprising the steps of:
 a) forming a plurality of air holes into a rear surface wall of said pocket portion;
 b) bending said index sheet into a predetermined form;
 c) covering an open portion of said magnetic tape cassette with said bent portion of said index sheet; and
 d) inserting said magnetic tape cassette and said index sheet into a pocket portion of said case such that air entrapped between said pocket portion and said magnetic tape cassette and index sheet is vented through said plurality of holes formed in said rear surface wall of said pocket of said case.

* * * * *